UNITED STATES PATENT OFFICE.

FREDERICK S. MARDON, OF NEW YORK, N. Y.

ANTISEPTIC AND DISINFECTANT.

1,358,227.     Specification of Letters Patent.     Patented Nov. 9, 1920.

No Drawing.     Application filed June 20, 1918. Serial No. 240,993.

*To all whom it may concern:*

Be it known that I, FREDERICK S. MARDON, a subject of the King of Great Britain, and a resident of the city of New York, borough of Manhattan, county of New York, and State of New York, have invented a certain new and useful Antiseptic and Disinfectant, of which the following is a specification.

This invention is a new and useful antiseptic and disinfectant, and is especially adapted as a pus cleanser in the treatment and healing of wounds, abrasions, ulcers, and all other conditions where such preparations are usually employed.

The composition in its entirety is composed of picric acid, potassium chlorate, tincture of iodin, chlorid of lime, sodium bicarbonate and glycerin. The proportions in which it has been found preferable to mix these ingredients is as follows:

| | |
|---|---|
| Picric acid, 1% solution | 1 oz. |
| Potassium chlorate | 2 gms. |
| Tincture of iodin | 2 ozs. |
| Chlorid of lime | 2 ozs. |
| Sodium bicarbonate | 2 gms. |
| Glycerin | 17 ozs. |

The several ingredients are mixed together and allowed to stand for several hours, with occasional stirring, whereupon the clear fluid is decanted off or filtered from the residuum, though I prefer to filter the preparation rather than decant it.

It is probable that certain chemical changes take place when the ingredients are mixed as described, the nature of which I am not prepared to state with certainty, as the resulting composition possesses properties and characteristics not assignable to any or all of the individual ingredients primarily entering into the composition.

The composition may be used in the customary way, preferably full strength, although it may, as the judgment of the physician or surgeon indicates, be more or less diluted to meet special conditions.

It will be understood that slight changes may be made in the composition described without departing from the spirit of the invention, the scope of which is commensurate with the appended claims.

Having thus fully described my invention, what I claim as new, and desire to secure by Letters Patent, is:

1. An antiseptic and disinfectant containing approximately 4% of a .3% picric acid solution, potassium chlorate not less than 3%, tincture of iodin not less than 5%, chlorid of lime approximately 5% sodium bicarbonate and glycerin, substantially 50%.

2. An antiseptic and disinfectant containing picric acid, 3% solution, approximately one ounce, potassium chlorate, approximately two grams, tincture of iodin, approximately two ounces, chlorid of lime, approximately two ounces, sodium bicarbonate, approximately two grams and glycerin approximately seventeen ounces.

3. An antiseptic and disinfectant resulting from the mixing of picric acid, 3% solution, substantially one ounce, potassium chlorate, substantially two grams, tincture of iodin, substantially two ounces, chlorid of lime, substantially two ounces, sodium bicarbonate, substantially two grams and glycerin substantially seventeen ounces.

4. An antiseptic and disinfectant containing picric acid solution, potassium chlorate, tincture of iodin, chlorid of lime and glycerin, none of which are present in less than 2% in quantity.

5. An antiseptic and disinfectant containing picric acid, tincture of iodin, chlorid of lime, sodium bicarbonate and glycerin, the percentage of glycerin being upward of 20%.

6. An antiseptic and disinfectant containing picric acid, tincture of iodin, chlorid of lime and glycerin, all of which are present in excess of two per cent. in quantity.

In testimony whereof, I have signed my name to this specification.

FREDERICK S. MARDON.